United States Patent [19]

Richardson et al.

[11] Patent Number: 5,332,068
[45] Date of Patent: Jul. 26, 1994

[54] SELF CONTAINED AUTOMATIC TERRAIN CONDITION ADJUSTING SHOCK ABSORBER

[75] Inventors: Donald G. Richardson, Valencia; J. Guy Cazort, Coron del Mar, both of Calif.

[73] Assignee: Richardson Technologies, Ltd., Sutter Creek, Calif.

[21] Appl. No.: 51,264

[22] Filed: Apr. 22, 1993

Related U.S. Application Data

[63] Continuation of Ser. No. 798,036, Nov. 20, 1991, abandoned, which is a continuation of Ser. No. 503,881, Apr. 3, 1990, abandoned.

[51] Int. Cl.$^5$ ............................................. F16F 9/34
[52] U.S. Cl. .................................... 188/275; 137/38
[58] Field of Search ...................... 188/275; 137/38

[56] References Cited

U.S. PATENT DOCUMENTS

| | | | |
|---|---|---|---|
| 1,281,079 | 10/1918 | Sears | 188/275 |
| 2,140,359 | 12/1938 | Hanna | 188/88 |
| 2,252,772 | 8/1941 | Katcher | 188/275 X |
| 2,329,803 | 9/1943 | Whisler, Jr. | 188/275 |
| 3,338,347 | 8/1967 | Avner | 188/88 |
| 3,414,092 | 12/1968 | Speckhart | 188/100 |
| 4,254,849 | 3/1981 | Pohlenz | 188/275 |
| 4,917,222 | 4/1990 | Bacardit | 188/275 |

FOREIGN PATENT DOCUMENTS

| | | | |
|---|---|---|---|
| 294846 | 9/1966 | Australia | 188/275 |
| 1125267 | 10/1956 | France | 188/275 |
| 1165327 | 10/1958 | France | 188/275 |
| 1175195 | 3/1959 | France | 188/275 |
| 1157292 | 4/1983 | U.S.S.R. | |
| 737486 | 9/1955 | United Kingdom | 188/275 |
| 794354 | 4/1958 | United Kingdom | 188/275 |

Primary Examiner—Matthew G. Graham
Attorney, Agent, or Firm—Christie, Parker & Hale

[57] ABSTRACT

A shock absorber which is inertia responsive in both compression and extension strokes to provide rapid flow in either direction responsive to rapid large changes in loading as caused by a bump or dip. The inertia responsive valving is located in the piston or the piston rod or both affording simple shock absorber body design and simple cooling. The inertia responsive valving members are longitudinally slidable and of substantially uniform cross section so as to be substantially immune to acceleration forces due to turns and are substantially insensitive to pressure changes.

23 Claims, 9 Drawing Sheets

FIG. 1

EXTENSION INERTIA FORCE PRESENT

FIG. 5a
RESTRICTED FLOW-
COMPRESSION AND
REBOUND

FIG. 5b
MAXIMUM FLOW
COMPRESSION

FIG. 5c
MAXIMUM FLOW-
REBOUND

SELF CONTAINED AUTOMATIC TERRAIN CONDITION ADJUSTING SHOCK ABSORBER

CROSS-REFERENCE TO RELATED APPLICATION

This is a continuation of application Ser. No. 07/798,036, filed Nov. 20, 1991, now abandoned, which is a continuation of Ser. No. 07/503,881, Apr. 3, 1990, now abandoned.

BACKGROUND OF THE INVENTION

A common, yet generally unrecognized, problem with present day shock absorbers for automobiles, off road vehicles, race cars and motorcycles is that the rebound (extension) resistance necessary to control the stored energy of the spring is of critical importance. The higher the spring rate, the more rebound resistance is needed.

One approach to the overall problem of shock absorber design in the past is to provide for adjustable rebound resistance. A high degree of adjustability in both compression and extension resistance from the exterior of shock absorbers has been achieved in the dual adjustment through the piston rod of the shock absorber of our co-pending patent application, U.S. Ser. No. 07/270,010, filed Nov. 14, 1988 now U.S. Pat. No. 4,958,706 issued Sep. 25, 1990. In our further development, we have learned that a high degree of adjustability of the shock absorber is highly effective when the track or road conditions are predictable and when the mechanic making the adjustment is thoroughly familiar with the effects of the adjustment.

We have found that the full range of adjustability available employing our previous invention is far greater than needed for normal operation conditions. It also became apparent that fully automatic self adjustment of compression and rebound characteristics, responsive to actual traveled surface conditions is more desirable than manual adjustment for precise terrain conditions.

Attempts have been made to have computer controlled shock absorbers employing sensors, solid state computers which are preprogrammed and electrically operated valves controlled by the computer. As with any computer, its output is no better that the input and even though its speed of operation is indeed amazing, the overall system response including the mechanical valves determines the actual speed of the adjustment.

We have calculated that a vehicle traveling at the modest rate of 60 miles per hour will advance over the ground approximately 6 inches in 5 milliseconds. A computer controlled system which has an overall response speed in that range will not allow for effective compensation for surface conditions based upon any remote sensing of either present or anticipated road conditions. By directing optical or other sensors ahead of the vehicle the sensors incur the problems of dust or other conditions which may mask the true conditions and prevent effective computer controlled compensation.

Examples of computer or electronic controlled shock absorber systems are disclosed in the following patents:

| | | |
|---|---|---|
| 4,685,698 | Klinkner et al | August 11, 1987 |
| 4,651,290 | Masaki et al | March 17, 1987 |
| 4,648,622 | Wada et al | March 10, 1987 |
| 4,506,909 | Makashima et al | March 26, 1985 |
| 4,468,050 and | L. K. Woods | August 28, 1984 |
| 4,634,142 | Woods et al | January 6, 1987 |

One other approach is to employ inertial responsive valves which require no computer nor manual adjustment. Inertial responsive valves have been used in shock absorbers as typified by the following patents:

| | | |
|---|---|---|
| 3,127,958 | H. T. Szostak | April 7, 1964 |
| 3,696,894 | Brady et al | October 10, 1972 |
| 4,082,169 | R. E. Bowles | April 4, 1978 |
| 4,492,290 | E. N. Zavodny | January 8, 1985 |
| Soviet Union 1,157,292 | Kuzmenko et al | May 23, 1985 |

These inertial responsive valves give an indication that self contained systems which internally respond to accelerations can be used to provide automatic adjustment of orifices in shock absorbers. However these disclosed systems do not recognize any importance in reduction in rebound resistance in the presence of terrain defects, particularly dips nor do they provide inertia responsive rebound damping reduction.

BRIEF DESCRIPTION OF THE INVENTION

Faced with this state of the art, and with experience in designing, building and testing externally adjustable shock absorbers, it became apparent that a basic single wall, shock absorber can be designed employing inertia responsive valving to provide automatic adjustment, not only in compression but in rebound or extension as well and remarkably improve the overall shock absorber performance.

Moreover, we found that it is possible to build such a shock absorber in which all valving necessary for operation is built totally into the piston assembly including the piston proper and the piston rod. We have found that inertia responsive valving in the compression stroke allows the stable feeling of the vehicle during "transition" or normal terrain but upon encountering bumps to provide a softer characteristic via an inertia valve enhances softer compression stroke circuit. The compression stroke inertia valve rides on a light spring which overcomes the weight of the inertia valve but allows the inertia force to overcome the spring and move the inertia valve longitudinally to open a larger orifice in the compression circuit and thereby make the compression stroke cycle smoother.

The application of brakes providing deceleration but not abrupt vertical movement does not operate the inertia valve, thereby defeating any "diving" tendency of the front of the vehicle. Similarly sideward acceleration on abrupt turns does not appreciably affect the near vertically positioned shock absorber so the inertia responsive valve is unmoved and the desired stiffness in the suspension system to maintain a stable body in turns is assured.

We have found that inertia responsive valving in the shock absorber is of even more importance in the rebound or extension stroke. We have discovered that the failure of a suspension system to track dips in the terrain can have greater disturbance to the vehicle stability than encountering a bump. The failure to track a dip means that the wheel loses contact with the surface momentarily to be followed by striking the opposite side of the dip. The net result is an unnecessarily rough ride and loss of traction. This is dealt with in our invention since the extension stroke inertia valve rides on a light spring which neutralizes the weight of the inertia valve, allowing the inertial force to overcome the spring and move longitudinally to open a larger orifice in the extension circuit and thereby make the extension stroke cycle smoother.

We have also found that reducing the rebound and compression damping substantially during a large part of the operating time can result in reduced operating temperature and allows the shock absorber to be of simpler design, e.g., no reservoir, double walls or return tubes.

Consistent with our previous invention, identified above, we have determined that both the compression and rebound inertia responsive characteristics may be adjusted externally since both can be located in the piston assembly with access via the piston rod. In an alternate embodiment of this invention, adjustability is also disclosed.

BRIEF DESCRIPTION OF THE DRAWING

This invention may be more clearly understood from the following description and by reference to the drawing in which.

DETAILED DESCRIPTION OF THE INVENTION

Figure 1:
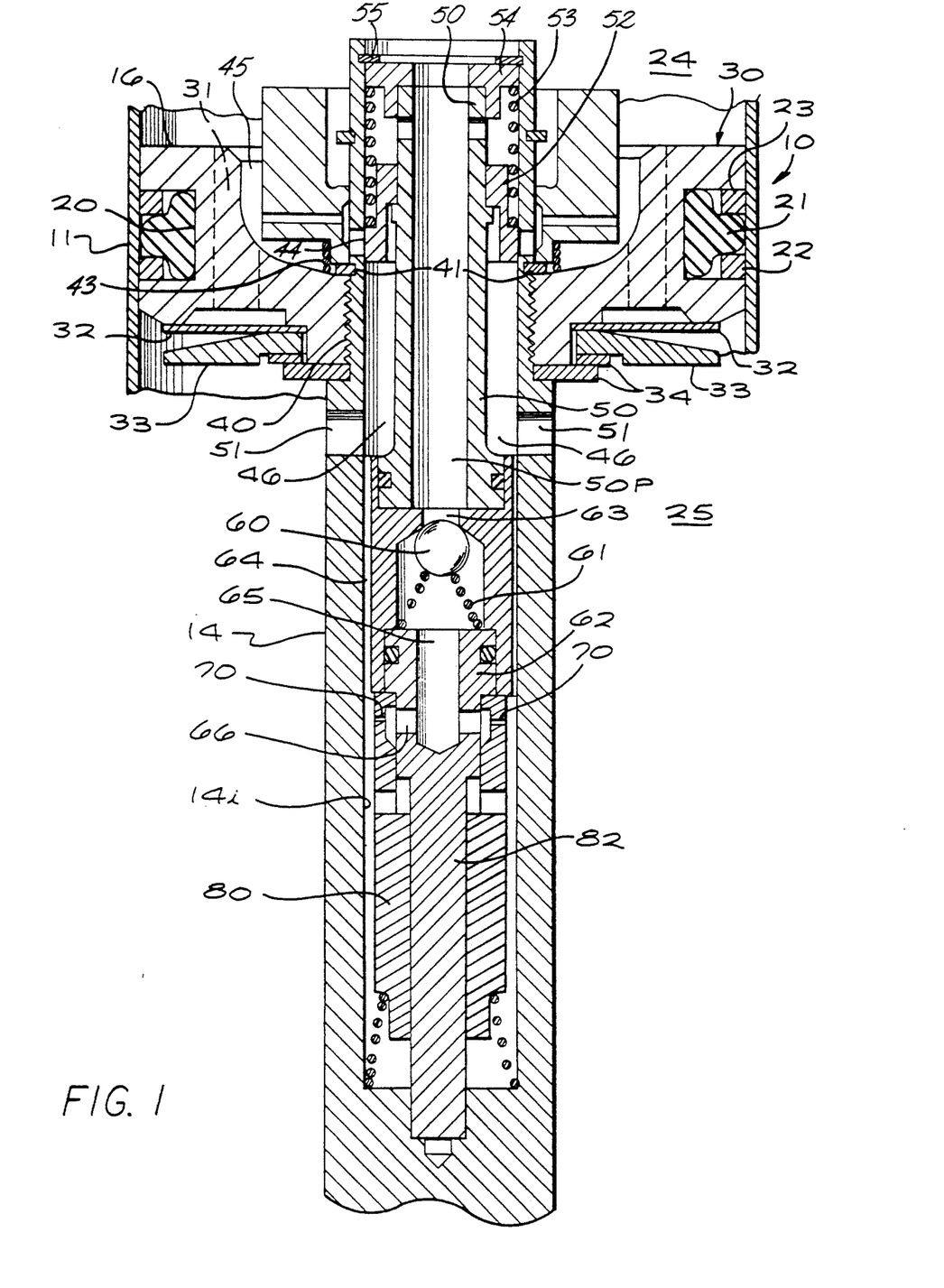
FIG. 1 is a longitudinal sectional view of the piston and piston rod assembly of one embodiment of this invention employing a pair of inertial responsive valve members but with no inertia forces acting, e.g. smooth ride.
Figure 1A:
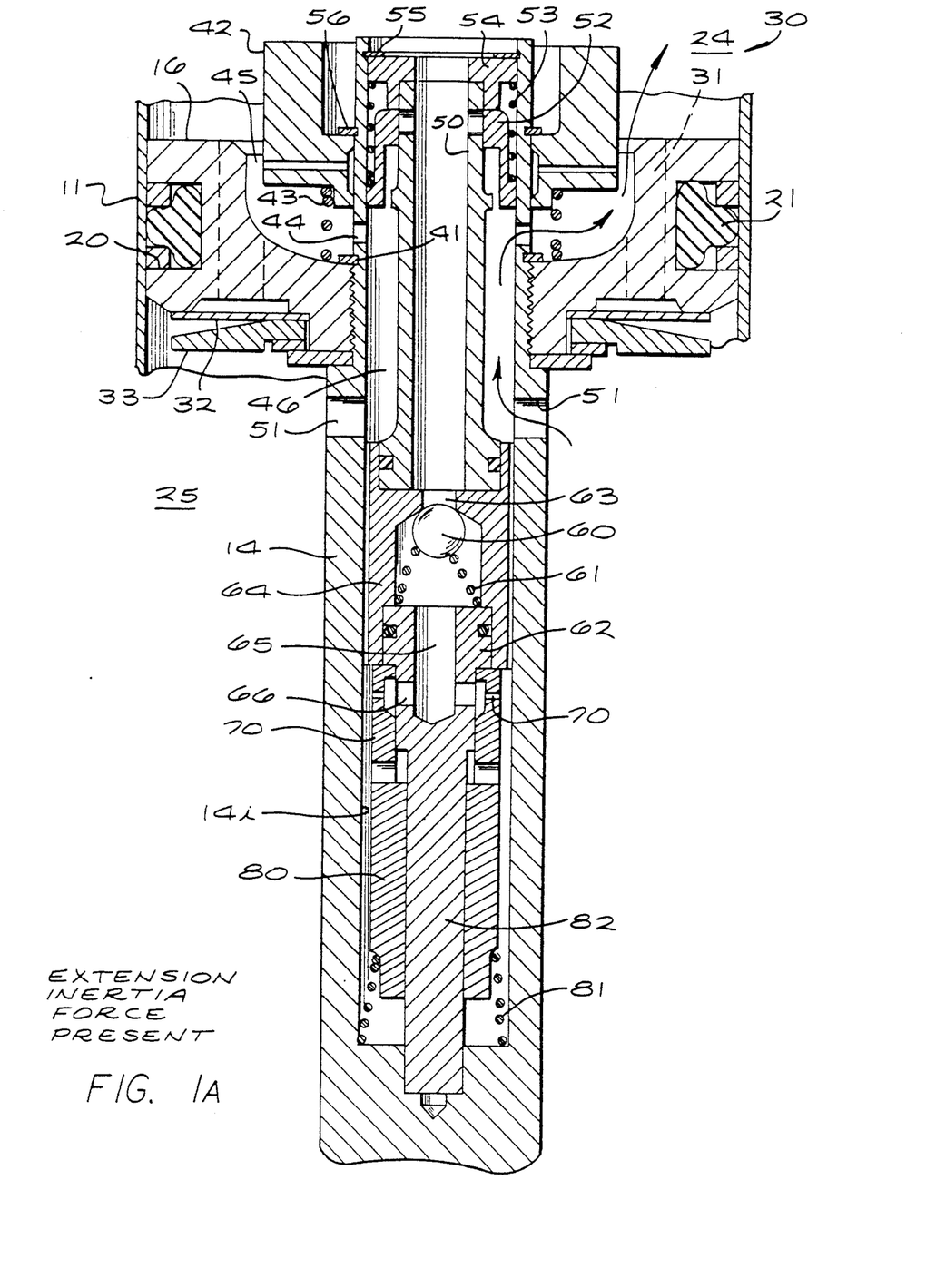
FIG. 1A is a longitudinal sectional view similar to FIG. 1 with the shock absorber in a different operational condition, namely with extension inertia force present.
Figure 1B:
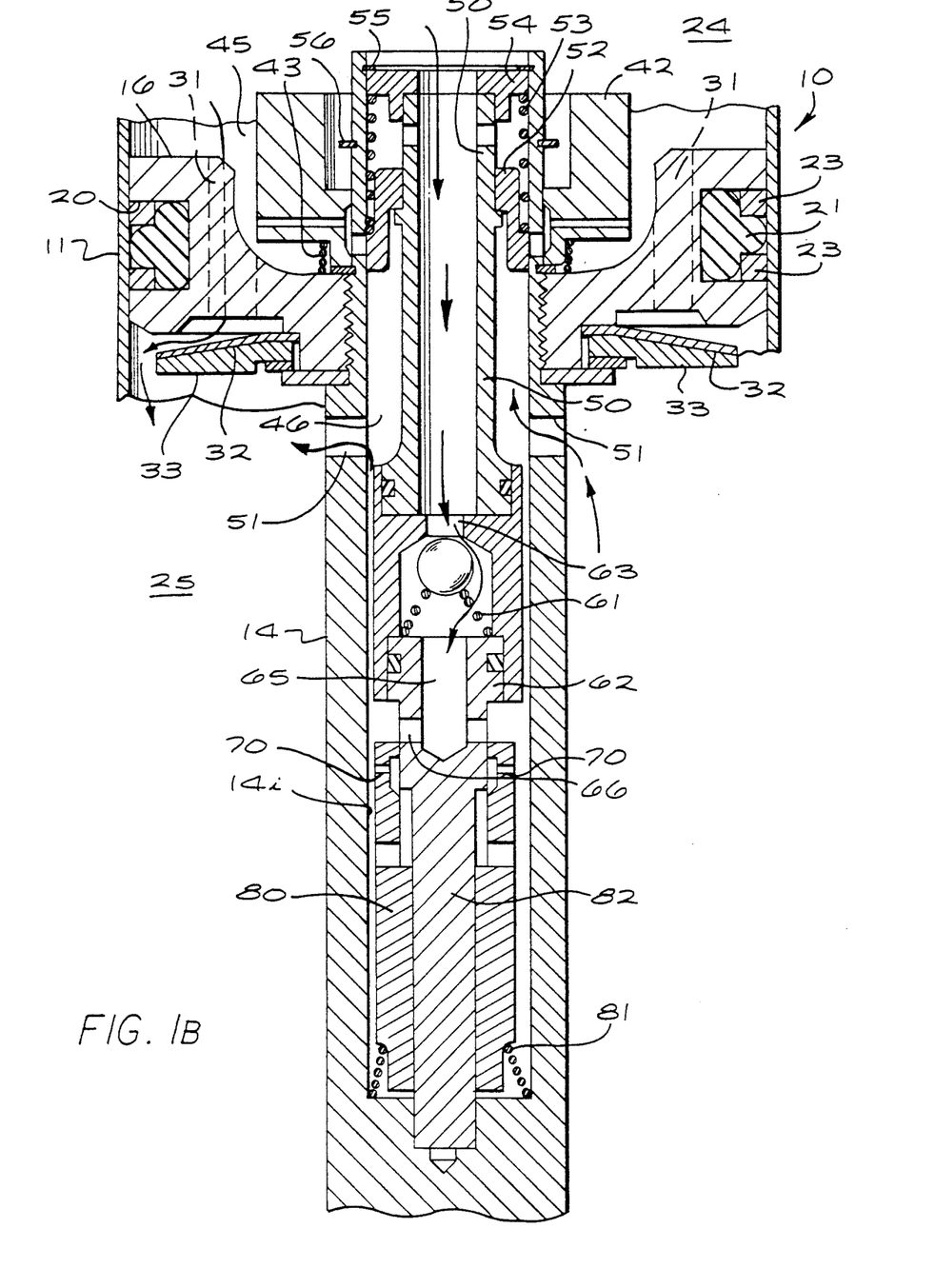
FIG. 1B is a longitudinal sectional view similar to FIGS. 1 and 1A with compression inertia force present.
Figure 2A:
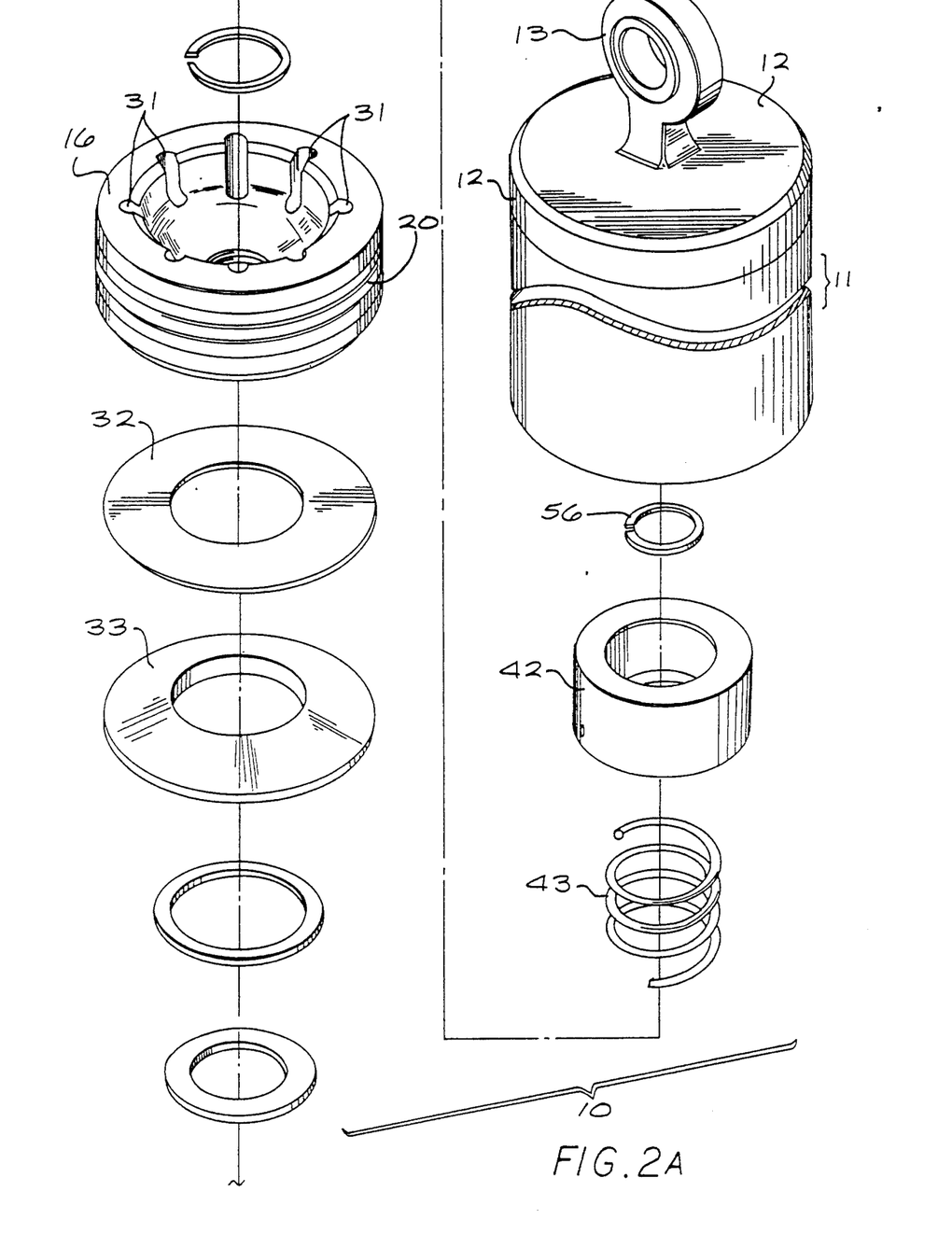
FIGS. 2A and B, together are an exploded view of an entire shock absorber including the piston and piston rod of the embodiment of FIG. 1.
Figure 2B:
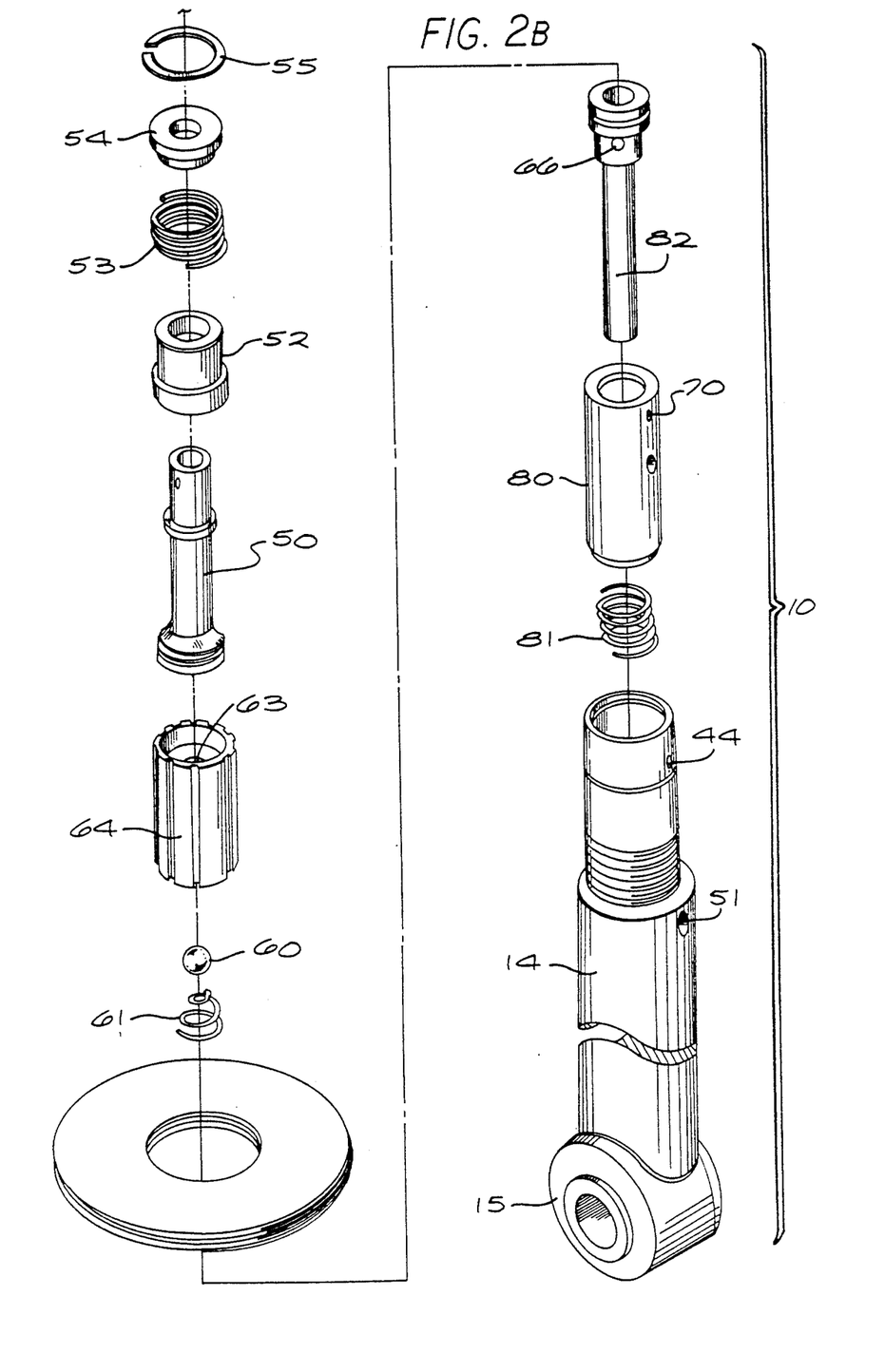

Now referring to FIGS. 1, 1A and 1B for the piston and rod assembly and 2A and 2B for the entire shock absorber, a totally self contained automatic terrain condition adjusting shock absorber 10 in FIGS. 2A and 2B is shown including a body 11 having an end cap 12 with an end fitting 13 designed to mount on the sprung portion of a vehicle. The body 11 has a single tubular wall which defines the shock absorber cylinder. It may be fabricated from aluminum with a hard anodize coating or mild steel and typically will have wall thickness of 0.125" and an overall length, depending upon the application of from 6" to 18" in length. The upper end of the tubular portion of the body 11 may be welded or in threaded engagement with the end cap 12. The body has an internal end seal (unshown) with a coaxial opening through which a hollow piston rod 14 extends with its end fitting 15 similar to end fitting 13. Fitting 15 is designed to be lowermost when mounted on the vehicle and engages an unsprung portion, namely the wheel suspension.

The upper end region of the piston rod 14 carries a piston 16 of generally recessed disk shape and having an annular recess 20 in which a T seal 21 is supported by a pair of back-up rings 22 and 23. The seal 21 provides an effective seal for hydraulic fluid contained within the shock absorber 10 within the upper chamber 24, above the piston 16 and in lower chamber 25 below the piston 16. The only flow paths between the chambers 24 and 25 is through the piston assembly 30 which includes the piston rod 14 and piston 16.

The piston 16 includes a plurality of radially displaced through apertures 31, for example, 8 in number, two of which are shown by dashed lines in FIG. 1. The lower side of the apertures 31 are all simultaneously closed by a washer shaped check valve 32 which is retained by lower stop 33 and a shim washer and spring fastener 34, commonly referred to as a Circlip. The apertures 31 allow normal flow from chamber 24 to chamber 25 during compression stroke (upward in the drawing, FIG. 2) movement of the piston 16.

The piston 16 is secured to the piston rod 15 by threads 40 and clip 41. The piston rod 14, as may be seen in FIG. 1, extends through the piston 16 and carries an inertial mass member 42 in slidable engagement with the outer surface of the piston rod 14. The mass member 42 is biased outward (upward in the drawing) by captured spring 43 thereby mass member 42 is maintained in near weightlessness when in its closed position and a series of ports 44 open in the wall of the piston rod 14. This allows communication between the chamber 24 and a chamber 25 via channel 45, annular groove 46 in a tubular rod insert 50 within the wall of piston rod 14 and radial ports 51 whenever the mass member 42 is in the position shown in FIG. 1A uncovering ports 44. The upper limit of movement of mass member 42 is defined by clip 56 at the outer end of piston rod 14.

The spring 43 tends to counteract the weight of the mass member 42 so that it responds to abrupt downward movement of the piston 16 and rod 14 to open the ports 44.

Inside the mass member 42 and secured to the end of piston rod 14 is a check valve assembly comprising tubular check valve 52, its bias spring 53, its stop 54 and spring clip retainer 55. The spring 53 normally biases the check valve 52 in its closed position as shown in FIG. 1 to be opened only when the pressure within chamber 25 exceeds that of chamber 24, on the extension or rebound stroke with the piston and rod moving downward in the drawing, FIG. 1.

A second check valve in the form of a ball 60 with its bias spring 61 is located within the piston 14 and retained by stop 62. This check valve 60 closes port 63 in fluted tubular member 64. The flutes of member 64, best seen in FIG. 2 B are in press fit engagement with the inner wall 14*i* of the piston rod 14 and the space between the flutes allows upward flow of fluid to ports 51 after passing downward through passage 50*p* of tubular member 50, past check valve 60 by depressing its spring 61, down through passage 65 in the stop 62, through radial ports 66 and ports 70 before beginning reverse flow through the flutes to port 51. This flow occurs on upward normal movement of the piston 16 and rod 14. The ports 70 are restricted.

Located below the check valve 60 and its assembly within the hollow portion of the piston rod 14 is a second inertial responsive member, namely a sleeve valve 80 which is biased against stop 62 by spring 81. The spring 81 may have a spring constant greater than is required to merely balance the weight of the sleeve 80 since a "weightless" inertia responsive valve is not as important on the compression stroke as we have found to be needed for the rebound or extension stroke. Guide 82 is secured to the bottom of the piston rod 14 recess and is in slip fit relationship with member 80. Upon rapid compression stroke, the inertia responsive member 80 remains in place in space and the rod 14 moves upward fully opening the communication between passage 65, port 66 and the return flow passages of fluted member 64 to ports 51. This reduces the resistance to compression stroke flow on rapid compression stroke movement.

After the rapid movement of the piston 16 and rod 14, the return spring 81 closes the flow path above the member 80 and again stops its compression stroke flow via this route. Flow is then limited to that through the restricted openings 70 in addition to the primary flow path through apertures 31 in the piston 16, as discussed above.

OPERATION OF THE EMBODIMENT OF FIGS. 1, 1A, 1B AND 2

The shock absorber of FIGS. 1 and 2 is normally installed as shown with the fitting 13 at the top, secured to the body or chassis of the vehicle and the fitting 15 secured as by a through bolt to a portion of the wheel suspension. In the case of four wheeled vehicles, such as race cars, the upper end of the shock absorber is secured to the chassis and the lower end of the shock absorbed is secured via a through bolt to the suspension. In the case of off-road four wheel vehicles, the upper end of the shock absorber is typically attached to the chassis and the lower end secured to the wheel suspension. In the case of coil-over-shock applications to which this invention is readily adapted, the mounting in each case is typically the same.

In the case of dual shock absorber motorcycle applications, the upper ends of the two shock absorbers are pivoted from opposite sides of the frame and the lower or piston rod ends are pivoted on the rear suspension swing arm. In these motorcycle applications, the coil-over-shock embodiment of this invention is preferred. In any of these applications, under smooth terrain as in FIG. 1, the shock absorber reacts like a conventional shock absorber except that due to its simplicity, lack of double walls and relatively massive porting, runs cool and provides a smooth ride. Whenever the wheel to which the shock absorber is coupled encounters any discontinuity in the surface, either a bump or a dip causing rapid compression or extension, one or the other of the inertia responsive valving members come into operation, the compression inertia valve member 80 on striking a bump to rapidly open the bypass channel, greatly reducing the compression resistance for a fraction of a second allowing the suspension system to absorb the shock and to allow the wheel to track the bump. This operation is illustrated in FIGS. 1B and 3B.

As soon as the bump begins to fade away, i.e., the back side of the bump, the stiff rebound resistance causes the suspension to extend and the rapid rebound or extension opens the rebound bypass path so that the wheel tracks the fading side of the bump without losing ground contact.

Figures 3A, 3B, 3C, 3D:
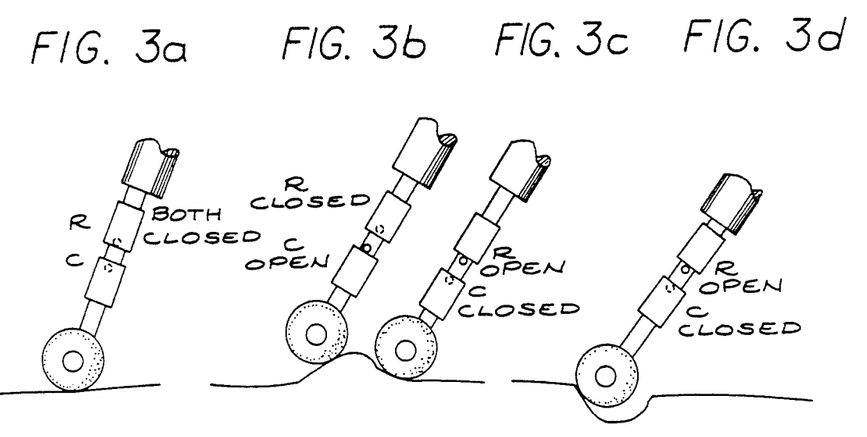
FIGS. 3a, 3b, 3c and 3d are simplified elevational views of a wheel-shock absorber combination encountering different types of discontinuities in the surface traveled.

Owing to the presence of the rebound or extension inertia responsive valve member, a suspension system employing the shock absorber of this invention can track the more difficult type of terrain anomaly, namely the dip as illustrated in FIG. 3 D. There, a rapid extension is required to follow the terrain. A rapid falling away of the road surface has been the nemesis of racing drivers and road drivers, as well, without full recognition of the problem or the needed solution. The rebound inertia responsive valve allows the wheel to track the dip and consequently have it in ground contact when it reaches the other side rather than striking the rear face of the dip after having lost road contact. The need for rapid compression on reaching the rear face of the dip is accomplished by the inertia responsive compression valve member 80. Therefore the cooperation between the rebound or extension inertia valve to allow tracking of the dip and the rapid release of compression stiffness by the compression inertia responsive valve allows the wheel to fully track both bumps and dips.

As a corollary to the above described operation, with the shock absorber being mounted general vertically, the inertia responsive valves are virtually insensitive to deceleration or lateral accelerations as incurred in rapid braking and abrupt turns. Therefore, the suspension employing this shock absorber does not respond to either of these normal driving maneuvers with any inertia responsive change in characteristics.

As a result of this invention, we are able to make the shock absorber much stiffer than before to control severe maneuvers, i.e., rapid lane changes, abrupt braking, etc. The most noticeable advantage is that we can now provide enough rebound damping to keep the race car stable after hitting a large bump, but still can have compliance over ripples.

Of equal importance is the fact that the porting controlled by the inertia responsive valves is radially designed and the valve operators are sleeve like structures of generally equal top and bottom surface areas. They are not pressure responsive to any detectable degree. Therefore, they truly are fully inertia responsive in both modes of shock absorber operation, compression and rebound and insensitive to the various other forces to which the shock absorber and its internal hydraulic fluid are subjected.

EMBODIMENT NO. 2

Figure 4:
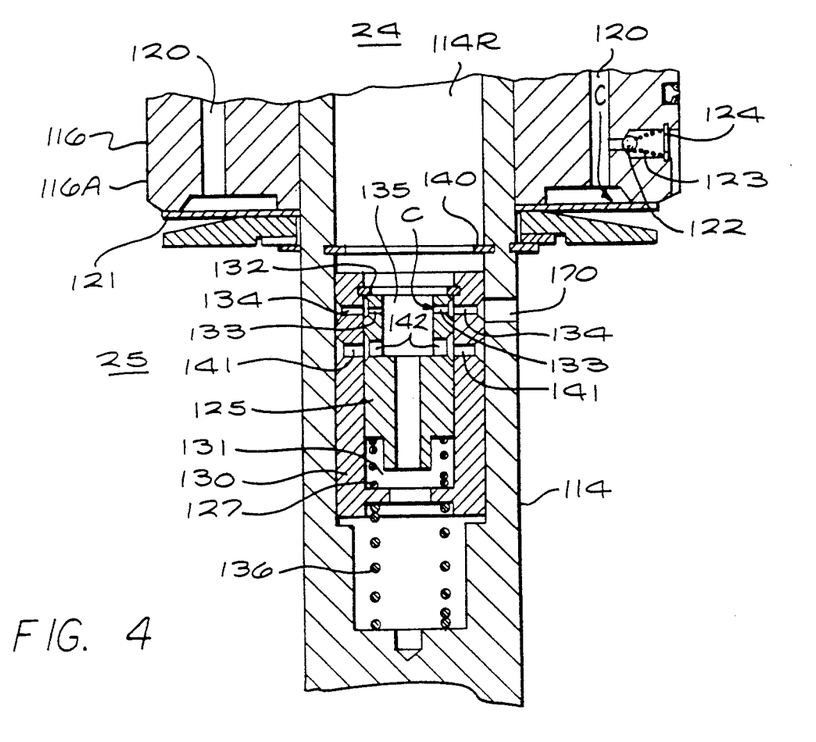
FIG. 4 is a fragmentary longitudinal sectional view of the piston and piston rod assembly of a second embodiment of this invention with both compression and inertia responsive valves located in the piston rod.

We have found that by employing the basic concept of this invention that it is possible to provide both compression and extension stroke inertia responsive valving, all within the piston rod whereby a simple piston head may be used. Such an embodiment is shown in FIG. 4 in which a piston 116 operating within a cylinder similar to cylinder 11 of FIGS. 1 and 2 and not shown in FIG. 4. The piston 116 includes a series of through apertures 120 similar to the corresponding apertures 31 of FIG. 1 as well as a spring washer 121 acting as a check valve blocking flow upward in the drawing, FIG. 4. A parallel flow path from upper chamber 24 to lower chamber 25 is included in the annular wall 116A of piston 116 including a check valve 122 with its associated bias spring 123 and stop 124.

The piston rod 114 is hollow at its upper end with an annular recess 114R in which a pair of coaxial inertial responsive sleeve valve members 125 and 130 are located. Valve member 125, the compression stroke responsive member is biased upward by spring 127 against retainer ring 132 which acts as a stop for the maximum upward position of compression inertia valve member 125. At this uppermost position, port 133 is aligned with port 134 of the rebound inertia valve 130. Therefore, in its normal at rest position as shown in FIG. 4, the compression inertia valve 125 allows restricted flow between chamber 24 and 25 via piston recess 114R, passage 135, port 133 in valve member 125, port 134 and port 170 in piston rod 114.

The rebound inertia valve 130 is urged upward by soft spring 136 to an upper limit set by clip 140. Valve 130 includes a plurality of side ports 141 normally aligned with ports 142 in valve member 125.

Figure 5A:
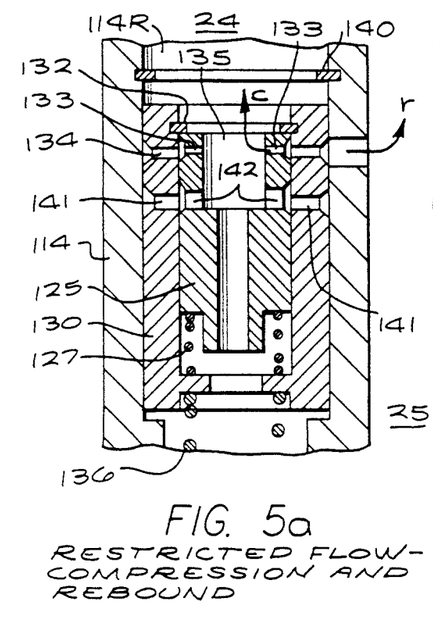
FIGS. 5a, 5b and 5c are a series of fragmentary longitudinal sectional views of the piston rod-inertial responsive valve combination of FIG. 4 shown in three different operational conditions.

In operation, normal restricted flow exists in both directions as is illustrated in FIG. 5a by the flow line and arrow heads c and r through recess 114R, passage 135, and aligned ports 133, 134 and 170. This is in addition to the normal compression flow following the arrow identified by the small c through check valve 122 and principally through ports 120 and past disc check valve 121 and through small port 133 of the compression inertia responsive valve 130.

Figure 5B:
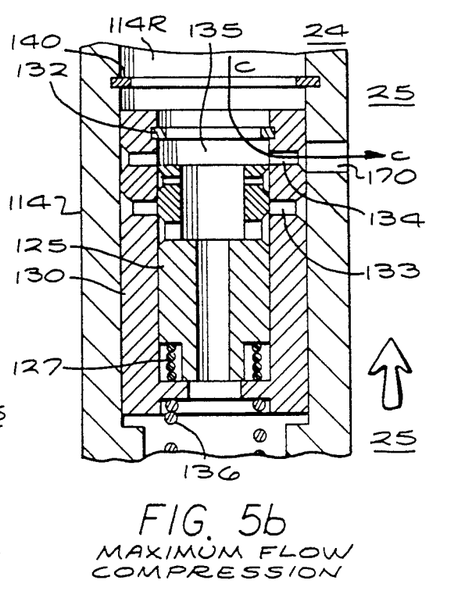

Upon rapid compression stroke movement, as illustrated in FIG. 4 and FIG. 5b, the compression inertia responsive valve 130 drops relative to the piston rod 114, opening port 134 wide open and port 133 is out of the way whereby the compression resistance is reduced by the added low resistance path identified by the capital C via recess 114R, passage 135, ports 133, 134 and 170 to chamber 25.

In rebound or extension at normal rates, flow from chamber 25 to chamber 24 follows the path indicated in FIG. 5a by the small r through ports 170, 134, 133, passage 135 and recess 114R.

Figure 5C:
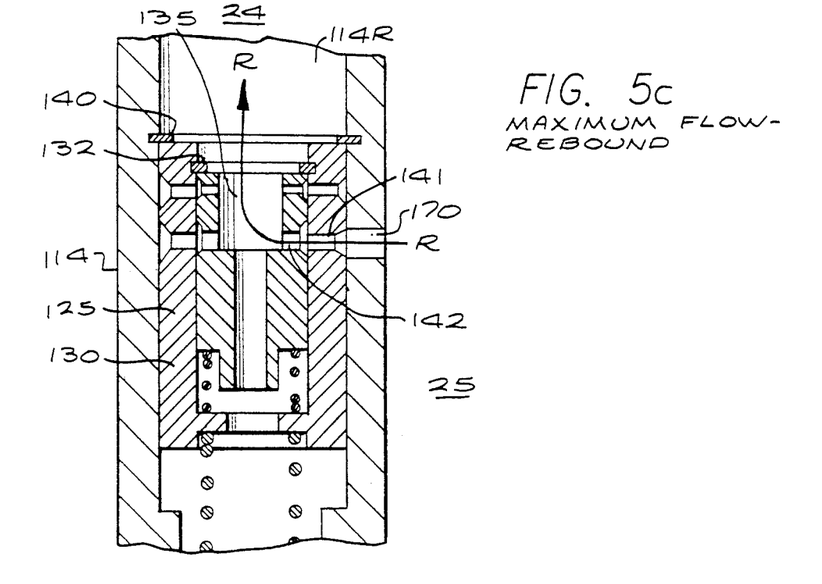

Upon rapid rebound or extension, as illustrated in FIG. 5c, the inertia valve 130 remains fixed in space and the rod 114 moves rapidly downward and flow at reduced resistance follows the path R from chamber 25, via port 170, port 141 which is now aligned with port 170, port 142 which remains unmoved relative to port 141, passage 135 and recess 114R to chamber 24.

EMBODIMENT NO. 3

Figure 6:
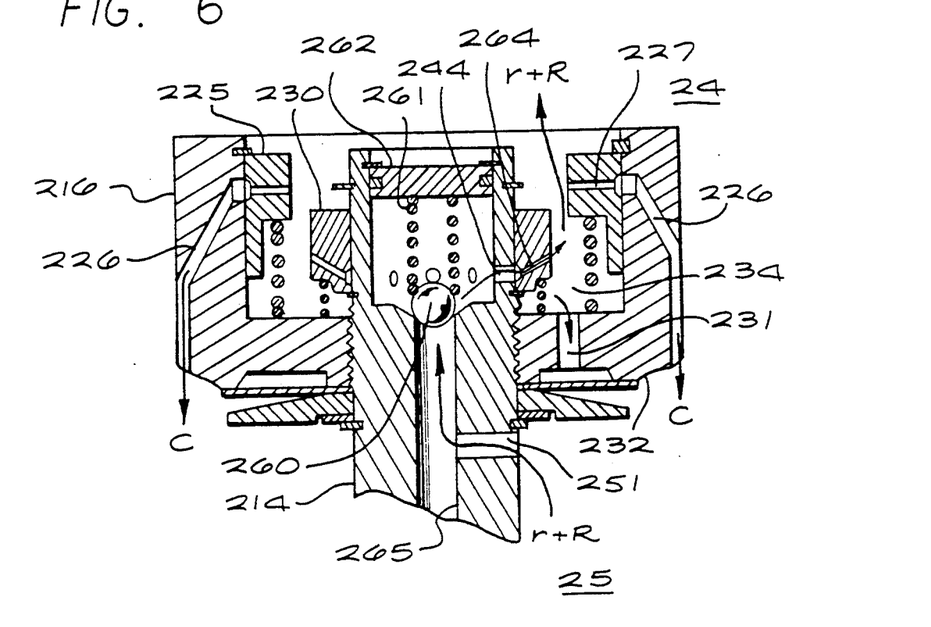
FIG. 6 is a fragmentary longitudinal sectional view of the piston and piston rod assembly of a third embodiment of this invention with two inertial responsive valve members, both located in the piston.

Referring now to FIG. 6, another embodiment of this invention may be seen in which both a compression inertia responsive and a rebound inertia responsive valve may be found, both within the piston 216 with the compression inertia valve 225 acting to control the flow through a port 226 in the piston 216 while rebound inertia responsive valve 230 is located coaxially within the piston 216, encircling the piston rod 214 and controlling the flow through port 244 in the piston rod 214. A single check valve 260 with its bias spring 261 and stop 262 prevent compression stroke flow through the piston rod 214.

Normal compression flow c from chamber 24 passes through recess 234, port 231, past disk spring check valve 232 to chamber 25. A second compression flow path exists from recess 234, via restricted ports 227 and ports 226 to chamber 25. On severe compression bumps, the compression inertia valve 225 remains relatively fixed in space and the piston 216 moves upward in the drawing, opening ports 226 to reduce the resistance in the compression stroke direction.

Normal extension flow r passes from chamber 25 via port 251 in the piston rod 214, through central passage 265, past open check valve 260, through port 244 in the piston rod 214 through recess 234 and into chamber 24 Abrupt extension flow results in rapid downward movement of rod 214 while valve 230 remains relatively unmoved, thus effectively removing valve 230 and opening the relatively large port 244 to reduce resistance in the rebound direction. This embodiment places both inertia responsive valves 225 and 230 in the same space, the recess in the head of the piston 216 in non interfering positions and both relatively unresponsive to pressure changes within the chamber 24 since they, again control radially extending ports and present virtually identical surface area, top and bottom.

FOURTH EMBODIMENT

Figure 7:
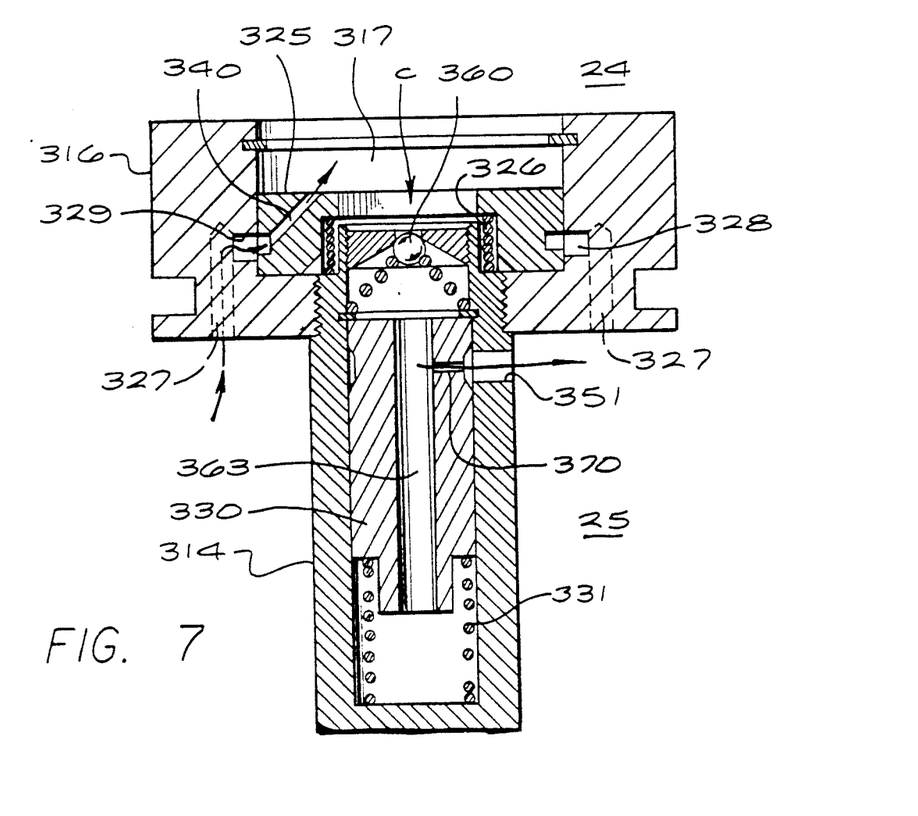
FIG. 7 is a fragmentary longitudinal sectional view of the piston and piston rod assembly of a fourth embodiment of this invention, similar to the embodiment of FIG. 6 but with different flow paths on compression and rebound operating strokes.

In FIG. 7, we have illustrated a dual compression-extension inertia responsive piston assembly in which the piston 316 is recessed and a rebound inertia responsive valve 325 is slidably mounted in the piston 316. A light spring 326 effectively neutralizes the weight of valve 325. A compression responsive member 330 is slidable mounted in the hollow interior of rod 314 and normally biased upward by spring 331 shown in its no inertia force present condition.

Normal compression flow from chamber 24 flows following the arrow c into the piston 316 cavity 3 17, past check valve 360, through passage 363, port 370 in the compression responsive member 330 and port 351 in piston 314 to chamber 25. In case of abrupt compression stroke movements, the compression inertia responsive member 330 remains relatively fixed in space and the piston 316 and piston rod 314 rapidly move upward in the drawing. This relative movement opens the port 351 to full flow from the check valve 360 without restriction. Normal extension flow passes through a series of axial passages 327 and into a annular opening 328 in piston 316 communicating with an annular opening 329 in valve 325 which, in turn, communicates with a diagonal passageway 340 leading into cavity 317, as indicated by the arrows. Rapid extension results in moving rod 314 and piston 316 rapidly downward leaving piston 325 in a relatively raised position leaving flow unobstructed from opening 328 to cavity 317, thus removing resistance in the rebound direction.

FIFTH EMBODIMENT

Figure 8:
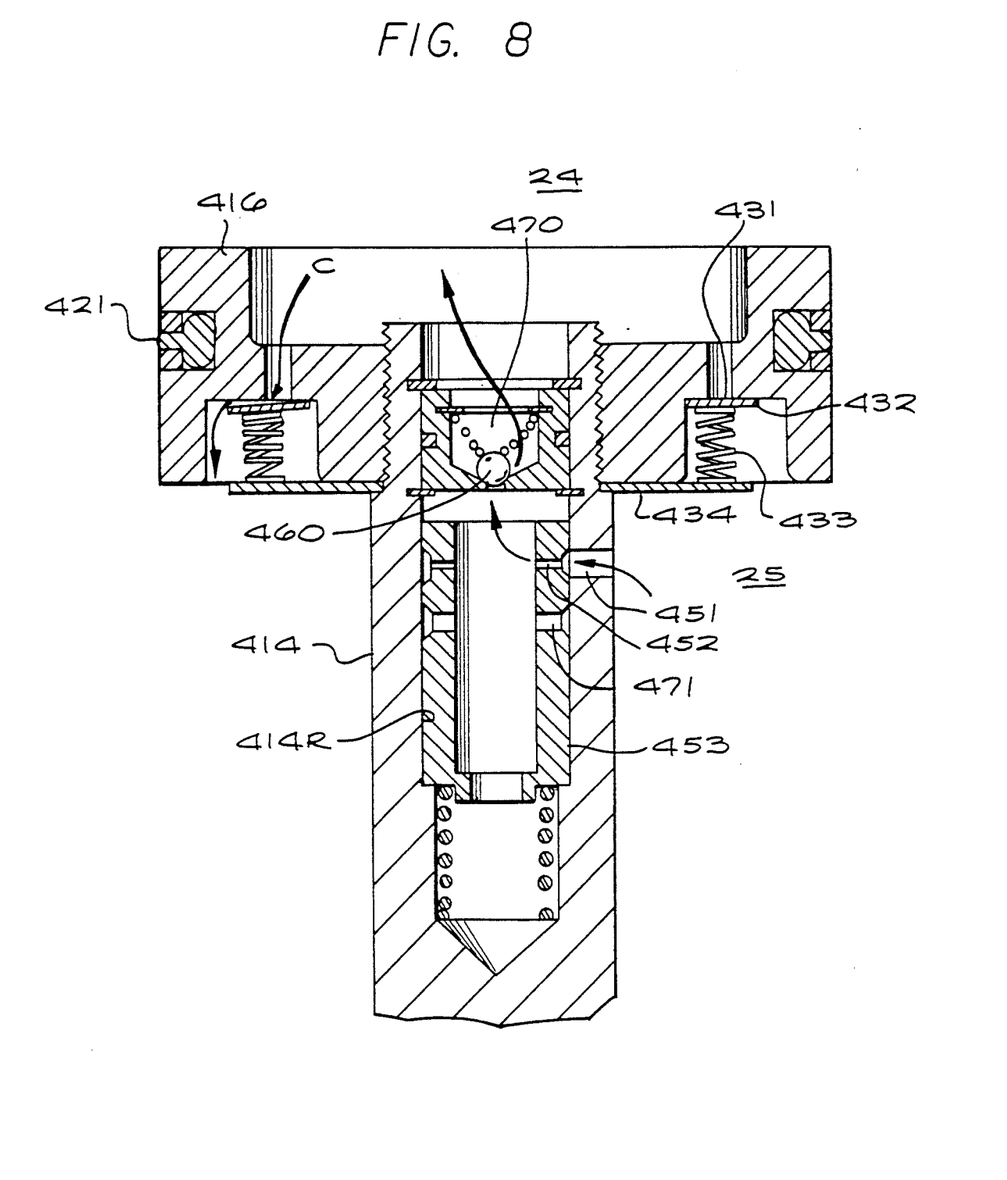
FIG. 8 is a fragmentary longitudinal sectional view of the piston and piston rod assembly of a fifth embodiment of this invention employing a single inertial responsive valve located in the piston rod.

FIG. 8 illustrates, perhaps the simplest, yet the most important feature of this invention in that it provides normal compression responsive operation with inertia responsive rebound or extension operation. In FIG. 8, a relatively simple, inexpensive piston 416 is shown threaded on piston rod 414. The piston 416 includes T seal 421 and a plurality, for example, 8, through ports 431 al 1 closed by ring check valve 432 which is spring biased closed by a plurality of helical springs 433 resting on retainer ring 434. The check valve 432 allows relatively free compression stroke flow in the direction of the c arrow.

Normal rebound flow from chamber 25, below the piston 416 to chamber 24 above the piston is via port 451 in piston rod 414, port 452 in rebound responsive valve member 453 within recess 414R of piston rod 414, past check valve 460, passage 470 and into chamber 24. Upon abrupt extension movement of the piston 416 and rod 414, the port 471 in valve member 453 moves into position joining port 451 and providing low resistance flow R in the rebound direction.

The embodiment of this Figure is the simplest and where extension inertia responsive movement is all that is needed this structure will suffice. It gives normal compressive and extension stroke operation plus low flow resistance in extension.

In each of the embodiments of FIGS. 1, 1A, 1B, 4, 6, 7 and 8 only the piston and piston rods are shown for simplicity and ease of comprehension. FIG. 2 shows an entire shock absorber and it is to be recognized that each of the embodiments of these figures will be incorporated in an entire shock absorber in accordance with well known shock absorber manufacturing practices including selecting dimensions, orifice sizes, seals and operating fluids for the particular application.

DESCRIPTION OF RESULTS: ON-GOING TESTING OF THIS INVENTION

This invention was first tested on off road vehicles. The test vehicle was a 1981 Class 10 off road race car Class 10 which is unlimited in suspension and restricted in engine size to 1650 cc. Because of the age of the test vehicle, it should not be considered as a front running car because of limited wheel travel (10" travel in front 11" travel in rear) as opposed to current state of the art vehicles have up to 20" travel in front, 24" travel in rear. In the first race in which these shock absorbers were used, the test vehicle won a 3rd in class and 7th overall using one of these shock absorbers and 2 conventional shock absorbers on each rear wheel.

In the next race, the same vehicle won first in class and 3rd overall this using the same configuration as in the earlier test. At this point, we felt that this reliability of this new design was sufficiently well enough to run with only these shock absorbers, at least in the race.

Using these shock absorbers in the rear (3 per wheel), the next test session resulted in a 15 mph increase in speed on a test track. This, the driver attributed solely to the shock absorbers.

We have found that in off road racing, the ability of the vehicle to maintain control over very rough terrain is the most important factor with the shock absorber of this invention; we now can spring the car very stiff to absorb impacts. They allow us to put more rebound dampening to control this stiff spring force yet not have the suspension "pack-up" due to this stiff dampening. "Pack-up" is defined as a condition where the rebound dampening is so stiff to control the spring force at full bottom out that it does not allow the suspension to fully extend when the spring is less compressed. As an example, when a car with 24" of wheel travel "packs-up", it actually is running with only 10-12" of active wheel travel. One solution to "pack-up" is to bypass the shock dampening when the wheel is fully extended. This has a negative effect on the cornering ability because it also bypasses the initial compression dampening and allows the chassis to roll into the turn. The shock absorber of this invention adjusts the dampening characteristics with respect to vehicle inertia not just spring and impact forces as in conventional shock absorbers. This feature allows the vehicle to maintain a very parallel relationship with the terrain with increased control and improved directional stability.

The next race using only shock absorbers of this invention, resulted in another first place and in the process was much faster than unlimited class cars with 3000 cc engine and state of the art suspensions. The driver felt that the initial testing using the combination of these shock absorbers and conventional shock absorbers "masked" the shock absorbers of this invention's effect and reduced the capability of the car. With normal shock absorbers this off road car was at best capable of running 80% as fast as its current state of the art competitors. Now it has a clear advantage. We have every reason to believe these shock absorbers, when applied to a state of the art car with more wheel travel, will result in a significant improvement over any existing cars regardless of engine size.

The foregoing description is illustrative of this invention and it is recognized that one of ordinary skill in the art after review of the disclosure herein may without departing from the spirit of this invention produce variations, not identical with the embodiments disclosed herein. Therefore, this invention is not limited to the foregoing embodiments but rather by the invention as defined by the following claims both literally and through the scope available under the Doctrine of Equivalents.

What is claimed is:

1. A shock absorber comprising:
a tubular body including an end fitting securing the body end of the shock absorber to the body of a vehicle;
said tubular body defining a cylinder;
a piston assembly including a piston and a piston rod;
said piston rod secured to said piston and extending out of the opposite end of said tubular body from said end fitting;
said piston in sealed longitudinal movement engagement within said cylinder and defining two fluid holding chambers within said cylinder;
an outer fitting on said piston rod securing the piston rod end of said shock absorber to the wheel supporting suspension of a vehicle;
means sealing said piston rod with respect to said cylinder;
said piston assembly including first port means for defining a restricted passage for a fluid between opposite sides of said piston for one direction of fluid flow in said shock absorber, and second port means for defining a restricted passage for a fluid flowing in the opposite direction between opposite sides of said piston;
one of said directions of flow of fluid being during a compression stroke of said shock absorber and the opposite direction of flow of fluid being during extension stroke of said shock absorber;
means for variably controlling the rate of flow of fluid through said piston assembly in the extension stroke; and
said variable controlling means comprising an inertial responsive member including a sleeve in longitudinal sliding relationship with said piston assembly and normally positioned against a stop below the inertial responsive member in flow restricting relationship with the restrictive passage for flow of fluid through said first port means and axially shiftable to a less flow restricting relationship with the passage upon downward acceleration of the wheel of the vehicle; and spring means within said piston assembly engaging said piston assembly and said sleeve and urging said sleeve in a generally upward direction when said shock absorber is mounted for operation on a vehicle and selected in spring rate to substantially neutralize the weight component of said sleeve whereby said sleeve responds to inertia forces to rapidly change the flow resistance during a rapid downward acceleration of the wheel.

2. A shock absorber in accordance with claim 1 including a second inertial responsive member and biasing means therefor; and said second inertial responsive member mounted for longitudinal movement within said piston assembly to control flow of fluid through said piston in the compression stroke of said shock absorber and normally biased in a flow limiting position by said biasing means against a stop in said piston assembly and responsive to rapid upward acceleration of the wheel to increase flow through said piston assembly.

3. A shock absorber comprising:

a body defining a hydraulic fluid containing housing including a longitudinally extending circular cylinder and one end fitting mounting the body of said shock absorber to the body of a vehicle;

a piston assembly including a piston and a piston rod with said piston and piston rod in sealed slidable engagement with said body to define two variable volume chambers within said body, one of said variable volume chambers lying between one end of said cylinder and the face of said piston adjacent to said piston rod and the second of said chambers between the opposite end of said cylinder and the face of said piston remote from said piston rod;

said piston rod extending out of said body and including a second end fitting securing the piston end of said shock absorber to the wheel supporting suspension of a vehicle;

means defining a compression stroke flow path through said piston assembly including radially extending orifice;

a first inertial responsive member mounted on said piston assembly for longitudinal movement relative to said piston assembly to control the flow through said radially extending orifice on the compression stroke only of said shock absorber;

means for biasing the first inertial responsive member toward a flow restricting position against a stop in the piston assembly;

means defining an extension stroke flow path through said piston assembly including a second radially extending orifice;

a second inertial responsive member mounted on said piston assembly for longitudinal movement relative to said piston assembly to control the flow through said second radially extending orifice on the extension stroke only of said shock absorber; and at least one additional flow path though said piston assembly;

whereby hydraulic fluid in said shock absorber may normally flow through said additional path during compression or extension strokes of said shock absorber and through said first or second radially extending orifices upon rapid compression or extension stroke to reduce the resistance to flow of the hydraulic fluid through said piston assembly subject to inertia responsive movement of either of said inertial responsive members.

4. A shock absorber in accordance with claim 3 wherein one of said inertial responsive members is positioned on said piston and the second inertial responsive member is positioned in said piston rod.

5. A shock absorber in accordance with claim 3 wherein said first and second inertial responsive members are located in said piston rod.

6. A shock absorber in accordance with claim 3 wherein said first and second inertial responsive members are located in said piston.

7. A shock absorber in accordance with claim 3 further comprising means for supporting a portion of the weight of the second inertial responsive member in a direction away from a flow restricting position in said piston assembly.

8. A shock absorber comprising:

a body defining a hydraulic fluid containing housing including a longitudinally extending circular cylinder and one end fitting mounting the body of said shock absorber to the body of a vehicle;

a piston assembly including a piston and a piston rod with said piston and piston rod in sealed slidable engagement with said body to define two variable volume chambers within said body, one of said variable volume chambers lying between one end of said cylinder and the face of said piston adjacent to said piston rod and the second of said chambers between the opposite end of said cylinder and the face of said piston remote from said piston rod;

said piston rod extending out of said body and including a second end fitting securing the piston end of said shock absorber to the wheel supporting suspension of a vehicle;

means defining a compression stroke flow path through said piston assembly including a radially extending orifice;

a first inertial responsive member mounted on said piston assembly for longitudinal movement relative to said piston assembly to control the flow through said radially extending orifice on the compression stroke only of said shock absorber;

means for biasing the first inertial responsive member toward a flow restricting position against a stop in the piston assembly;

means defining an extension stroke flow path through said piston assembly including a second radially extending orifice;

a second inertial responsive member mounted on said piston assembly for longitudinally movement relative to said piston assembly to control the flow through said second radially extending orifice on the extension stroke only of said shock absorber; and at least one additional flow path though said piston assembly;

whereby hydraulic fluid in said shock absorber may normally flow through said additional path during compression or extension strokes of said shock absorber and through said first or second radially extending orifices upon rapid compression or extension stroke to reduce the resistance to flow of the hydraulic fluid through said piston assembly subject to inertia responsive movement of either of said inertial responsive members; and wherein said first and second inertial responsive members are coaxially positioned in said piston rod.

9. A shock absorber in accordance with claim 8 wherein said piston rod includes a longitudinal extending recess therein and includes a port therein communicating between the interior of said piston rod and a first hydraulic fluid containing chamber in said shock absorber surrounding the length of said piston rod containing said port and said first inertial responsive member comprises a sleeve mounted for longitudinal movement within said longitudinally extending recess of said piston rod to control the flow of hydraulic fluid through the said port in said piston rod.

10. A shock absorber in accordance with claim 9 wherein said first inertial responsive member includes first and second ports communicating between the interior of said piston rod and said port in said piston rod; and wherein said second inertial responsive member comprises a longitudinally extending body in sliding engagement with the interior of said first inertial responsive member to control the flow of hydraulic fluid through said first and second ports in said first inertial responsive member.

11. A shock absorber in accordance with claim 10 including bias means for normally urging said second inertial responsive member to reduce flow through port in said first inertial responsive member; and the force of said bias means being overcome by inertial forces upon rapid movement of said shock absorber in compression to allow reduction in the flow resistance of said shock absorber during rapid compression movement.

12. A shock absorber in accordance with claim 9 including bias means for normally urging said first inertial means to close said port in said piston rod; and the force of said bias means being overcome by inertial forces upon rapid movement of said shock absorber in extension to allow reduction in the flow resistance of said shock absorber during rapid extension movement.

13. A shock absorber comprising:

a body defining a hydraulic fluid containing housing including a longitudinally extending circular cylinder and one end fitting mounting the body of said shock absorber to the body of a vehicle;

a piston assembly including a piston and a piston rod with said piston and piston rod in sealed slidable engagement with said body to define two variable volume chambers within said body, one of said variable volume chambers lying between one end of said cylinder and the face of said piston adjacent to said piston rod and the second of said chambers between the opposite end of said cylinder and the face of said piston remote from said piston rod;

said piston rod extending out of said body and including a second end fitting securing the piston end of said shock absorber to the wheel supporting suspension of a vehicle;

means defining a compression stroke flow path through said piston assembly including a radially extending orifice;

a first inertial responsive member mounted to said piston assembly for longitudinal movement relative to said piston assembly to control the flow through said radially extending orifice on the compression stroke only of said shock absorber;

means for biasing the first inertial responsive member toward a flow restricting position against a stop in the piston assembly;

means defining an extension stroke flow path through said piston assembly including a second radially extending orifice;

a second inertial responsive member mounted on said piston assembly for longitudinal movement relative to said piston assembly to control the flow through said second radially extending orifice on the extension stroke only of said shock absorber; and at least one additional flow path through said piston assembly;

whereby hydraulic fluid in said shock absorber may normally flow through said additional path during compression or extension strokes of said shock absorber and through said first or second radially extending orifices upon rapid compression or extension stroke to reduce the resistance to flow of the hydraulic fluid through said piston assembly subject to inertia responsive movement of either of said inertial responsive members; and wherein said first and second inertial responsive members are coaxial in said piston.

14. A shock absorber in accordance with claim 13 wherein said piston includes an annular recess in its face opposite said piston rod;

said piston including a radially extending port therein in said annular recess and communicating with the opposite face of said piston; and said first inertial responsive member comprising an annular ring in slidable relation with said piston and in flow controlling relation with said port in said piston.

15. An inertia sensitive shock absorber connected between the body of a vehicle and a wheel of the vehicle comprising:

a hollow cylinder;

a piston assembly in the cylinder dividing the cylinder into an upper chamber and a lower chamber, the cylinder being connected to body o the vehicle, and the piston assembly being connected tot he wheel of the vehicle;

means for passing fluid between the upper and lower chambers upon compression and extension of the shock absorber with a restricted rate of flow;

a first inertial mass in the piston assembly for opening a port and increasing flow of fluid from the upper chamber to the lower chamber when upward acceleration of the wheel is at a rate greater than a predetermined magnitude; and a second inertial mass in the piston assembly for opening a port and increasing flow of fluid from the lower chamber to the upper chamber when downward acceleration of the wheel is at a rate greater than a predetermined magnitude, the second inertial mass being different from the first inertial mass.

16. An inertia sensitive shock absorber as recited in claim 15 wherein the first inertial mass comprises:

a port within the piston assembly;

a sleeve adjacent to the port and slidable between a first position closing the port and a second position opening the port; and means for biasing the sleeve toward the position closing the port.

17. An inertia sensitive shock absorber as recited in claim 15 wherein the second inertial mass comprises:
a port within the piston assembly;
a sleeve adjacent to the port and slidable between a first position closing the port and a second position opening the port; and
means for biasing the sleeve toward the position opening the port.

18. An inertia sensitive shock absorber as recited in claim 17 further comprising a check valve in series with the port for preventing fluid flow from the upper chamber to the lower chamber when pressure in the upper chamber is greater than pressure in the lower chamber and permitting fluid flow from the lower chamber to the upper chamber when the pressure in the lower chamber is greater than pressure in the upper chamber.

19. An inertia sensitive shock absorber as recited in claim 15 comprising:
first means for biasing the first inertial mass toward a position for closing aport and restricting fluid flow between the chambers; and
second means for biasing the second inertial mass toward a position for opening a port and restricting fluid flow between the chambers, wherein the second means for biasing is different from the first means for biasing.

20. An inertia sensitive shock absorber connected between the body of a vehicle and a wheel of the vehicle comprising:
a hollow cylinder;
a piston assembly in the cylinder dividing the cylinder into an upper chamber and a lower chamber, the cylinder being connected to the body of the vehicle, and the piston assembly being connected to the wheel of the vehicle;
means for passing fluid between the upper and lower chambers upon compression and extension of the shock absorber with a restricted rate of flow;
a first inertial mass in the piston assembly for opening a port and increasing flow of fluid from the upper chamber to the lower chamber when upward acceleration of the wheel is at a rate greater than a predetermined magnitude comprising:
a port within the piston assembly,
a sleeve adjacent to the port and slidable between a first position closing the port and a second position opening the port,
a stop, and
means for biasing the sleeve toward the position closing the port and against the stop; and
a second inertial mass in the piston assembly for opening a port and increasing flow of fluid from the lower chamber to the upper chamber when downward acceleration of the wheel is at a rate greater than a predetermined magnitude.

21. An inertia sensitive shock absorber connected at one end to the body of a vehicle and at the other end to a wheel of the vehicle comprising:
a tubular housing;
a piston assembly in the housing comprising a piston and a piston rod, the piston dividing the housing into an upper chamber and a lower chamber;
means for passing shock absorber fluid from the upper chamber to the lower chamber through the piston assembly with a restricted flow rate during compression of the shock absorber;
a first port through the piston assembly between the upper and lower chambers;
a first movable inertial mass in the piston assembly arranged so that the piston moves upwardly relative to the first inertial mass for opening the first port when the acceleration of the piston toward the upper chamber is greater than a first predetermined magnitude for increasing flow of fluid from the upper chamber to the lower chamber;
a stop in the piston assembly;
means for biasing the first inertial mass against the stop;
means for passing shock absorber fluid from the lower chamber to the upper chamber through the piston assembly with a restricted flow rate during extension of the shock absorber;
a second port through the piston assembly between the upper and lower chambers;
a second movable inertial mass int he piston assembly arranged so that the piston moves downwardly relative to the second inertial mass for opening the second port when acceleration of the piston toward the lower chamber is greater than second predetermined magnitude for increasing flow of fluid from the lower chamber to the upper chamber;
means connecting the tubular housing to a vehicle; and
means connecting the piston rod to the wheel of the vehicle.

22. A shock absorber comprising:
a body defining a hydraulic fluid containing housing including a longitudinally extending circular cylinder and one end fitting mounting the body of said shock absorber to the body of a vehicle;
a piston assembly including a piston and a piston rod with said piston and piston rod in sealed slidable engagement with said body to define two variable volume chambers within said body, one of said variable volume chambers lying between one end of said cylinder and the face of said piston adjacent to said piston rod and the second of said chambers between the opposite end of said cylinder and the face of said piston remote from said piston rod;
said piston rod extending out of said body and including a second end fitting securing the piston end of said shock absorber to the wheel supporting suspension of a vehicle;
means defining a compression stroke flow path through said piston assembly including radially extending orifice;
a first inertial responsive member mounted on said piston assembly for longitudinal movement relative to said piston assembly to control the flow through said radially extending orifice on the compression stroke only of said shock absorber;
means for biasing the first inertial responsive member toward a flow restricting position against a stop in the piston assembly;
means defining an extension stroke flow path through said piston assembly including a second radially extending orifice;
a second inertial responsive member mounted on said piston assembly for longitudinal movement relative to said piston assembly to control the flow through said second radially extending orifice on the extension stroke only of said shock absorber; and at least one additional flow path though said piston assembly;

whereby hydraulic fluid in said shock absorber may normally flow through said additional path during compression or extension strokes of said shock absorber and through said first or second radially extending orifices upon rapid compression or extension stroke to reduce the resistance to flow of the hydraulic fluid through said piston assembly subject to inertia responsive movement of either of said inertial responsive members; and wherein said first and second inertial responsive members are coaxial.

23. An inertia sensitive shock absorber connected between the body of a vehicle and wheel of the vehicle comprising:

a hollow cylinder;

a piston assembly in the cylinder dividing the cylinder into an upper chamber and a lower chamber, the cylinder being connected to the body of the vehicle, and the piston assembly being connected to the wheel supporting suspension of the vehicle;

means for passing fluid between the upper and lower chambers upon compression and extension of the shock absorber with a restricted rate of flow;

a first inertial mass in the piston assembly for opening a port and increasing flow of fluid from the upper chamber to the lower chamber when upward acceleration of the wheel is at a rate greater than a predetermined magnitude comprising:

a port within the piston assembly, a sleeve adjacent to the port and slidable between a first position closing the port and a second position opening the port, and means for biasing the sleeve toward the position closing the port;

a second inertial mass in the piston assembly for opening a port and increasing flow of fluid from the lower chamber to the upper chamber when downward acceleration of the wheel is at a rate greater than a predetermined magnitude; and a check valve in series with the port for preventing fluid flow from the lower chamber to the upper chamber when pressure in the lower chamber is greater than pressure in the upper chamber and permitting fluid flow from the upper chamber to the lower chamber when the pressure in the upper chamber is greater than pressure in the lower chamber.

* * * * *